(12) United States Patent
Kuo et al.

(10) Patent No.: US 9,396,092 B1
(45) Date of Patent: Jul. 19, 2016

(54) SOFTWARE TESTING WITH FEEDBACK ACQUISITION

(71) Applicant: Amazon Technologies, Inc., Reno, NV (US)

(72) Inventors: Calvin Yue-Ren Kuo, Irvine, CA (US); James William Bender, Pebble Beach, CA (US); Gabriel Badescu, Carlsbad, CA (US); Spencer Lyle Voorheis, Arroyo Grande, CA (US); Jedd Weise, Mission Viejo, CA (US)

(73) Assignee: Amazon Technologies, Inc., Reno, NV (US)

( * ) Notice: Subject to any disclaimer, the term of this patent is extended or adjusted under 35 U.S.C. 154(b) by 42 days.

(21) Appl. No.: 14/226,619

(22) Filed: Mar. 26, 2014

(51) Int. Cl.
*G06F 9/44* (2006.01)
*G06F 11/36* (2006.01)

(52) U.S. Cl.
CPC .................................. *G06F 11/3668* (2013.01)

(58) Field of Classification Search
None
See application file for complete search history.

(56) References Cited

U.S. PATENT DOCUMENTS

| 7,185,367 | B2 | 2/2007 | Munson |
| 7,216,341 | B2 | 5/2007 | Guarraci |
| 7,539,978 | B1 | 5/2009 | Haddox et al. |
| 8,566,796 | B2 * | 10/2013 | Cates ............................ 717/128 |

OTHER PUBLICATIONS

Technical Report, "Crowdsourcing for Usability Testing", Di Liu, et al., Mar. 2012, pp. 1-8.
TC, Ubertesters Makes Beta Testing Mobile Apps Easier, Will Offer Crowdsourced On-Demand Testers Soon, Frederic Lardinois, Nov. 4, 2013, pp. 1-9.
U.S. Appl. No. 14/226,609, filed Mar. 26, 2014, Calvin Yue-Ren Kuo.

* cited by examiner

*Primary Examiner* — Qamrun Nahar
(74) *Attorney, Agent, or Firm* — Robert C. Kowert; Meyertons, Hood, Kivlin, Kowert & Goetzel, P.C.

(57) ABSTRACT

Methods and systems for software testing with feedback acquisition are disclosed. Modified program code is generated based on programmatic analysis of original program code. The modified program code includes the original program code and a plurality of additional instructions. The additional instructions implement user interface prompts soliciting answers to user feedback questions. The modified program code is sent to one or more client devices for execution. User input responsive to the user interface prompts is then received from the one or more client devices.

17 Claims, 12 Drawing Sheets

SOFTWARE TESTING WITH FEEDBACK ACQUISITION

BACKGROUND

A software release life cycle may involve many stages of development for an application or other piece of computer software. For example, the stages may include an initial development stage, a generally available release of a first version, and a release of updated versions (including bug fixes and/or modified features) for the remainder of the life cycle. Throughout the various stages, the software may undergo software testing to determine whether it works as expected. In the initial development stage, an alpha release of the software may be tested internally by the developer. Based on the testing of the alpha release, the software may be modified to yield greater stability and other improvements. Eventually, a beta release that incorporates these improvements and typically includes a complete set of features may be released to a set of users for additional testing. Depending on whether the beta is a closed beta or open beta, the set of users may be highly restricted (e.g., based on invitation by the developer) or instead open to a larger group. The users may test the beta release for usability, stability, performance, or any other desired characteristics, and the users may report their findings (e.g., any encountered bugs or usability issues) to the developer. The developer may improve the software based on the findings from the users. Multiple versions of the beta release may be issued and retested as improvements are made by the developer.

Typically, a user of a beta release may use the software for an arbitrary length of time and then switch to another application or context (e.g., a web browser or e-mail client, or another tab or window thereof) to record and submit the findings. If the user tests the beta version for a relatively long time before recording the findings, the user may forget to record important observations. Furthermore, some users may neglect to record or submit their findings altogether.

Figure 1:
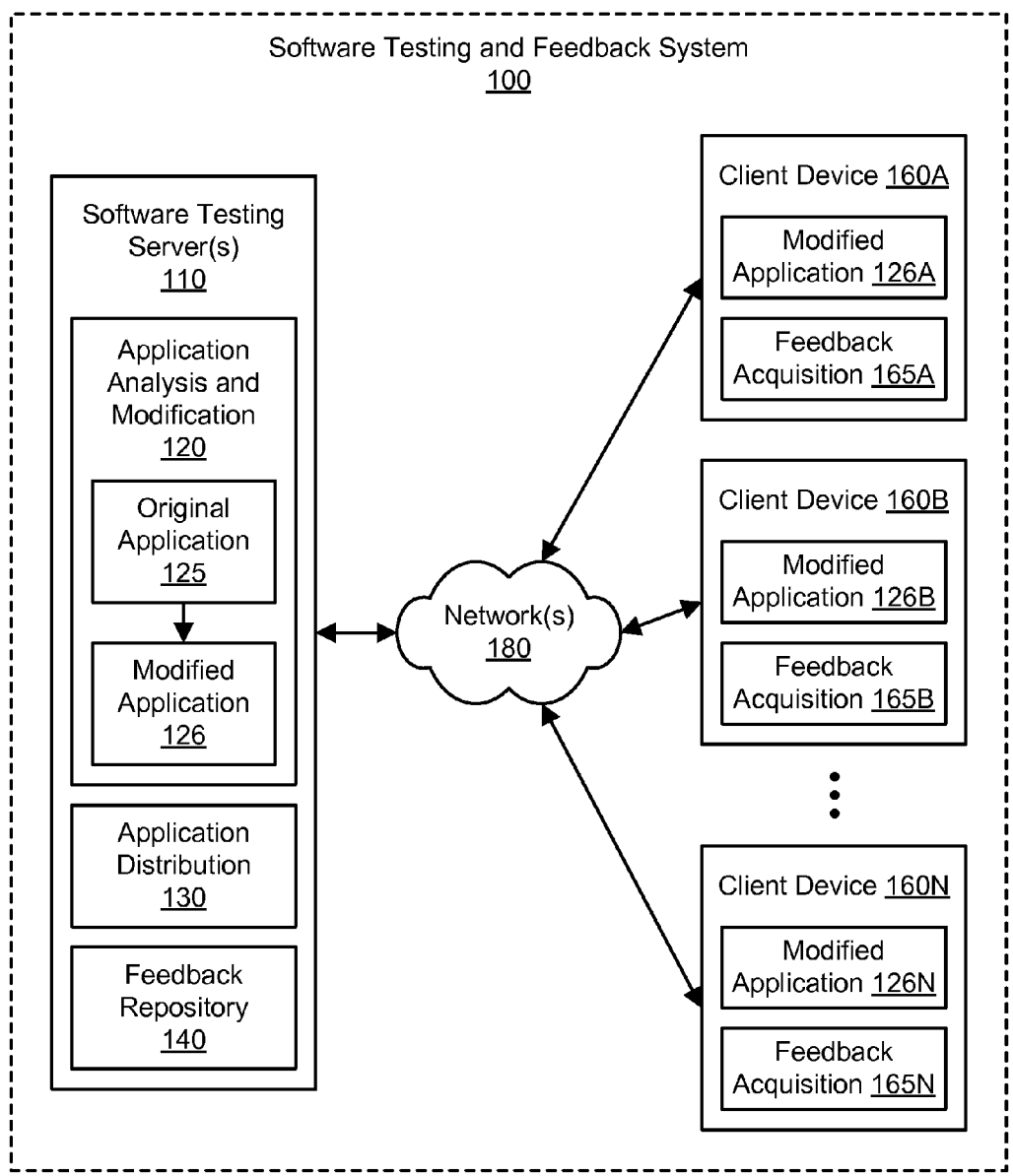
FIG. 1 illustrates an example system environment for software testing with feedback acquisition, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for performing software testing with feedback acquisition are described. Using the methods and systems as described herein, an application or other item of software may be automatically modified to collect user feedback. The program code of the application may be modified to insert additional instructions for collecting user feedback, and the user feedback may be collected at a variety of points during program execution. The additional instructions may be based on user feedback questions submitted by the developer. The application may be modified based on programmatic analysis to match relevant ones of the user feedback questions to corresponding points in the program code. In this manner, user feedback may be acquired for software in an automated manner without the developer needing to modify the program code of the software by manually adding custom instructions.

Various embodiments of methods and systems for a virtual device farm for software testing are described. Using the methods and systems as described herein, users of client devices (e.g., smartphones, tablets, other mobile devices, desktop computers, etc.) may register to participate in a software testing program. A software testing server may determine the respective configurations of the client devices in the software testing program. The configuration of a client device may indicate its hardware characteristics, software characteristics, and/or manufacturer and model. Based on the configuration of a device, one or more applications may be selected and automatically installed on the device for programmatic testing of the application(s), e.g., without necessarily requiring user input. The testing may be initiated in a manner that mitigates any inconvenience to the user, such as by initiating the testing when the device is relatively idle and has sufficient power. In this manner, applications may be automatically tested using a large and varied pool of client devices that implement a target platform such as a particular mobile operating system.

FIG. 1 illustrates an example system environment for software testing with feedback acquisition, according to one embodiment. The example system environment may implement a software testing and feedback system 100. The software testing and feedback system 100 may include at least one software testing server 110 and a plurality of client devices such as client devices 160A and 160B through 160N. Although one software testing server 110 and three client devices 160A, 160B, and 160N are illustrated for purposes of example, it is contemplated that any suitable number and configuration of software testing servers and client devices may be used with the software testing and feedback system 100. The software testing and feedback system 100 may use one or more networks 180 and interconnections to couple the various components. Elements of the software testing and feedback system 100 may be located in any suitable location relative to one another.

In various embodiments, the software testing server 110 may provide software modified for feedback acquisition to one or more of the client devices 160A-160N over the network(s) 180. The software testing server 110 may include a plurality of components that are configured to perform aspects of software testing, such as analyzing software, modifying the software, providing the modified software to the clients 160A-160N, and collecting feedback from the clients relating to the modified software. For example, the software testing server 110 may include application analysis and modification functionality 120, application distribution functionality 130, and a feedback repository 140. The software testing server 110 may comprise one or more computing devices, any of which may be implemented by the example computing device 3000 illustrated in FIG. 11. In various embodiments, the functionality of the different services, components, and/or modules of the software testing server 110 (e.g., application analysis and modification functionality 120, application distribution functionality 130, and feedback repository 140) may be provided by the same computing device or by different computing devices. If any of the various components are implemented using different computing devices, then the respective computing devices may be communicatively coupled, e.g., via a network. Each of the application analysis and modification functionality 120, application distribution functionality 130, and feedback repository 140 may represent any combination of software and hardware usable to perform their respective functions, as discussed as follows.

In some embodiments, the software testing server 110 may be implemented using one or more virtual compute instances and/or one or more physical compute instances. The virtual compute instances and/or physical compute instances may be provisioned and maintained by a provider network that manages computational resources, memory resources, storage resources, and network resources. A virtual compute instance may comprise one or more servers with a specified computational capacity (which may be specified by indicating the type and number of CPUs, the main memory size, and so on) and a specified software stack (e.g., a particular version of an operating system, which may in turn run on top of a hypervisor). One or more virtual compute instances may be implemented by the example computing device 3000 illustrated in FIG. 11.

In one embodiment, the application analysis and modification functionality 120 may analyze an original application 125 and produce a modified application 126. As used herein, the term "application" generally includes any suitable item of software or software package. The original application 125 may be provided to the software testing server 110 by a developer of the application using any suitable interface. The original application 125 may include a set of program code expressed using any suitable programming language(s), including higher-level programming languages, bytecode (or other machine language for a virtual machine), and/or machine language. As will be described in greater detail below, the application analysis and modification functionality 120 may analyze the original application 125 using programmatic analysis to find locations where the program code should be modified for acquisition of user feedback. As used herein, the term "programmatic analysis" generally includes the execution of computer program instructions to analyze the program code of the original application 125 in an automatic manner, e.g., without requiring additional user input after the analysis has been initiated.

Once the application analysis and modification functionality 120 has identified locations in the program code of the original application 125 where the code should be modified, the application analysis and modification functionality 120 may generate a modified application 126. The modified application 126 may be generated based on the original application 125 using any suitable technique, including bytecode injection. In one embodiment, the modified application 126 may include the program code of the original application plus one or more additional instructions. The additional instructions may be executable on a suitable platform (e.g., a suitable set of computing hardware running a suitable operating system or other executable environment), such as a platform implemented by the client devices 160A-160N, to prompt a user for user input at various points during execution of the modified application 126. As will be described in greater detail below, the additional instructions may be executed to acquire user feedback related to the functioning of the modified application 126.

In one embodiment, both the original application 125 and the modified application 126 may represent a "beta" release of an application. The developer of the beta release may seek to have a set of users test the application and report back with their user feedback. Using the systems and methods described herein, an application provided by a developer may be automatically modified for user feedback acquisition and made available to users for download, and the user feedback may be collected from users and made available to the developer.

In one embodiment, the software testing server 110 may be associated with a software marketplace, also referred to as an application store. The software marketplace may offer different applications or other items of software to a variety of clients such as client devices 160A-160N. The software marketplace may offer an application selection interface to the client devices 160A-160N. In one embodiment, the application selection interface may be implemented using a marketplace application, an instance of which runs on each of the client devices 160A-160N. Using the application selection interface provided by the marketplace application, any of the client devices 160A-160N may select and download suitable applications from the software marketplace over the network(s) 180. The software marketplace may include any suitable authentication and/or payment functionalities to provide secure purchasing and downloading of selected applications.

In one embodiment, the application distribution functionality 130 may implement aspects of a software marketplace. The modified application 126 may be provided to suitable client devices using the application distribution functionality 130. Each of the client devices 160A-160N may comprise one or more computing devices, any of which may be implemented by the example computing device 3000 illustrated in FIG. 11. In one embodiment, the set of client devices 160A-160N may be restricted by the developer to a particular set of invited users, e.g., if the beta release is a "closed" beta release. In one embodiment, the set of client devices 160A-160N may be generally open to a broader and/or self-selected set of users, e.g., if the beta release is an "open" beta release. In one embodiment, each of the client devices 160A-160N may connect to the software testing server 110 over the network(s) 180, e.g., using a local marketplace application executing on each of the client devices 160A-160N. Using an application selection interface provided by the local marketplace application, each of the client devices 160A-160N may select the modified application 126 for downloading to the storage of the respective client device. In one embodiment, the original application 125 may be provided to some of the client devices, and the modified application 126 may be provided to others of the client devices. For example, a sampling approach may be used to seek feedback from a particular percentage (e.g., 5%) of users, and the modified application 126 may be provided only to those users.

Each of the client devices 160A-160N may thus store and execute an instance of the modified application 126, such as modified application 126A on client device 160A, modified application 126B on client device 160B, and modified application 126N on client device 160N. Each of the client devices 160A-160N may include a feedback acquisition functionality, such as feedback acquisition functionality 165A on client device 160A, feedback acquisition functionality 165B on client device 160B, and feedback acquisition functionality 165N on client device 160N. At various points during execution of the modified application on one of the client devices, the feedback acquisition functionality on the client device may assist in the collection of user feedback relating to the modified application. For example, the user feedback may relate to the usability, stability, performance, or any other desired characteristics of the modified application.

In one embodiment, the feedback acquisition functionality may be implemented using the marketplace application on each of the client devices 160A-160N. In one embodiment, when one of the additional instructions in the modified application is executed on a client device, the additional instruction may cause a user interface element, such as a popup window, to be displayed using the feedback acquisition functionality. The user interface element may be displayed by a different application than the modified application in response to an intent or other form of inter-application message sent from the modified application to the application that displays the user interface element (e.g., the feedback acquisition functionality 165A-165N of a marketplace application). The user interface element may prompt the user to enter user feedback regarding the user's experiences with the modified application. The feedback may represent answers to the user feedback questions that are posed to the user. In one embodiment, the user may be required to enter feedback using the user interface element before the user is permitted to proceed further in the execution of the modified application.

In one embodiment, the feedback repository 140 may store user feedback sent from the client devices 160A-160N to the software testing server 110. Although the feedback repository 140 is illustrated as a component of the software testing server 110, it is contemplated that the feedback repository 140 may be implemented using any suitable computing devices and storage resources. The user feedback may be sent to the feedback repository 140 by the application that displayed the user interface element and collected the user input, such as the local marketplace application on each of the client devices 160A-160N. The user feedback in the feedback repository 140 may include feedback from multiple different client devices or users (e.g., client devices 160A-160N), feedback for multiple different applications, and/or feedback for multiple different versions of an application. The feedback repository 140 may organize and store the user feedback using any suitable data management and storage technologies. The elements of user feedback that are relevant to an application provided by a particular developer may be made available to that developer, e.g., by sending the relevant feedback to the developer at suitable intervals or by making the relevant feedback accessible to the developer in the feedback repository 140. Based on the user feedback acquired in this manner, the developer may make improvements to an application.

Figure 2:
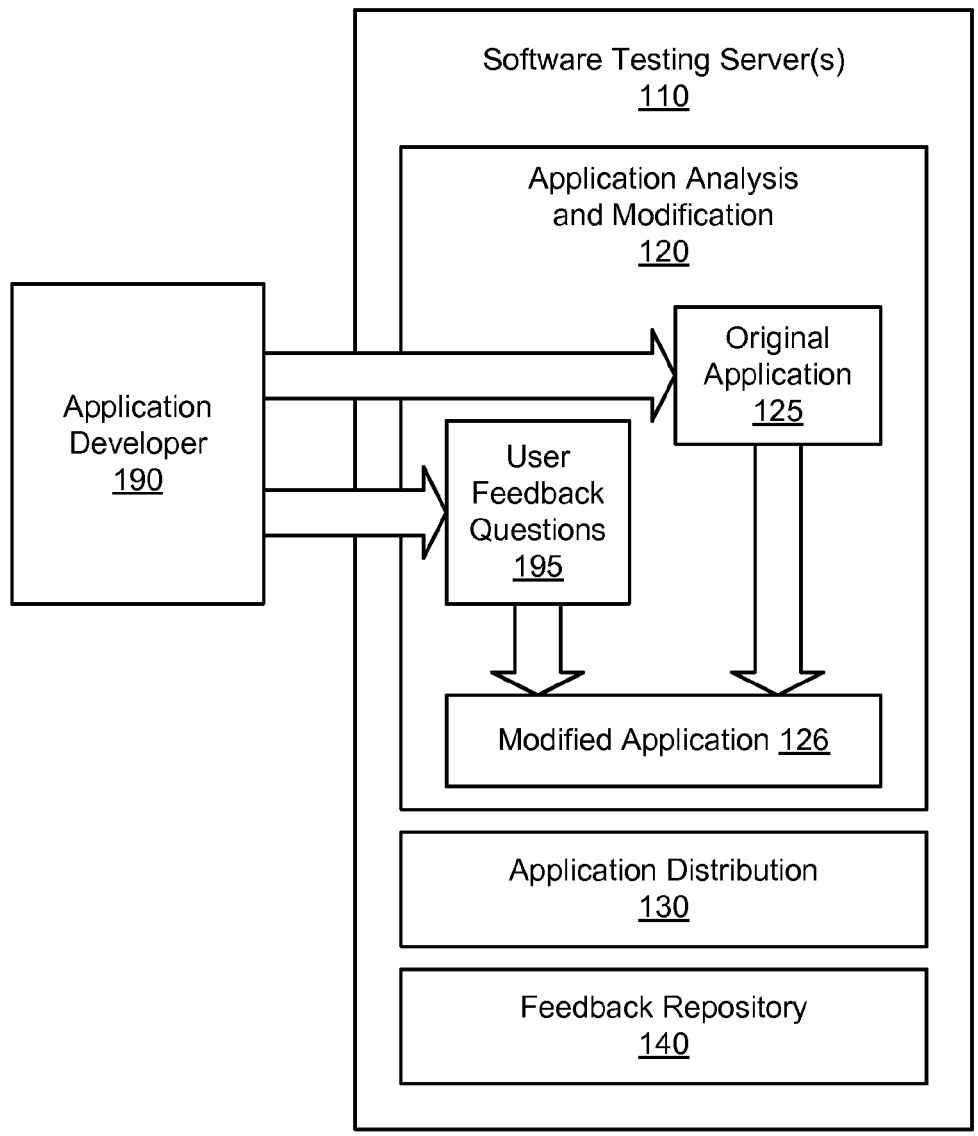
FIG. 2 illustrates further aspects of the example system environment for software testing with feedback acquisition, according to one embodiment.

FIG. 2 illustrates further aspects of the example system environment for software testing with feedback acquisition, according to one embodiment. As discussed above, the program code of the original application 125 may be modified to insert additional instructions for collecting user feedback at a variety of points during program execution. The original application 125 may be supplied to the software testing server 110 by an application developer 190. As illustrated in FIG. 2, the application developer 190 may represent a computing device operated by one or more users associated with a business entity or other organization known as an application developer. Alternatively, the application developer 190 as shown in FIG. 2 may represent the one or more users themselves or the business entity or organization itself.

The additional instructions may be based on user feedback questions 195 also submitted by the developer 190. The user feedback questions 195 may comprise any suitable set of questions soliciting user feedback on the application. For example, the user feedback questions 195 may relate to the user's experience regarding the usability, stability, performance, or any other desired characteristics of the application. In one embodiment, some of the user feedback questions 195 may relate to the totality of the execution of the application (e.g., general questions regarding the user's experience). In one embodiment, some of the user feedback questions 195 may relate to specific elements of the application (e.g., questions regarding particular phases, stages, or levels of the application). In one embodiment, each of the user feedback questions 195 may be defined in various categories (e.g., an "end of level" category) for ease of matching a question in a particular category to a relevant point in the program code. Using the application analysis and modification functionality 120, the application may be modified based on programmatic analysis to match relevant ones of the user feedback questions 195 to corresponding points in the program code. For example, the end of a level of a game application may be matched to a question soliciting user feedback regarding a level of the game; the program code may be modified so that the question is presented to the user before a method returns to end the level. In one embodiment, the modified application 126 may be generated automatically and programmatically based on the original application 125 and the user feedback questions 195, e.g., without requiring additional input from the developer after the submission of the original application 125 and the user feedback questions 195. In one embodiment, the application analysis and modification functionality 120 may present various options to the developer 190 during the analysis and/or modification, and the analysis and/or modification may proceed based on the input solicited from the developer 190.

Figure 3:
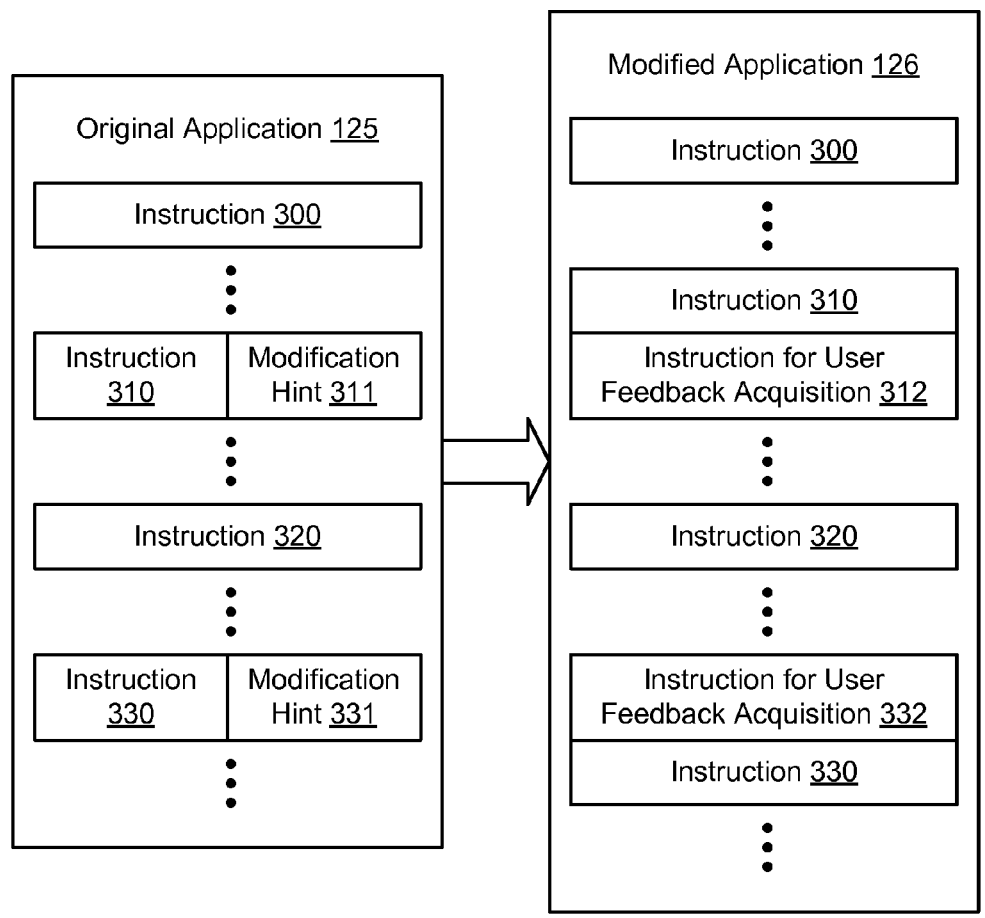
FIG. 3 illustrates an example of modification of application program code for software testing with feedback acquisition, according to one embodiment.

FIG. 3 illustrates an example of modification of application program code for software testing with feedback acquisition, according to one embodiment. As discussed above, the program code of an original application 125 may be modified based on programmatic analysis to match relevant ones of the user feedback questions 195 to corresponding points in the program code. The resulting program code of the modified application 126 may include additional instructions for user feedback acquisition in addition to the instructions in the program code in the original application 125. As shown in the example of FIG. 3, an original application 125 may include instructions 300, 310, 320, and 330. Although four instructions 300, 310, 320, and 330 are shown for purposes of illustration and example, it is contemplated that other numbers and configurations of instructions may be used with the systems and methods described herein.

In one embodiment, the application analysis and modification functionality 120 may search the program code of the original application 125 for hints, also referred to as modification hints. The hints may tend to indicate locations in the program code where additional instructions should be inserted to acquire user feedback. In one embodiment, the hints may include annotations or comments in the program code. For example, a comment "level complete" may indicate a location in the program code where a level of a game has been completed. In one embodiment, the hints may include the names of particular variable declarations and/or the names of particular methods. In one embodiment, the hints may include the usage of particular APIs (application programming interfaces) or function calls. In one embodiment, at least some of the hints, such as particular method names, may be specified by the developer along with the original application and the user feedback questions. Generally, the hints may include any executable element or non-executable element of the program code that tends to indicate a point in application execution where user feedback may be solicited. As shown in the example of FIG. 3, instruction 310 may be associated with (e.g., immediately before, immediately after, or otherwise nearby) a modification hint 311. Similarly, instruction 330 may be associated with (e.g., immediately before, immediately after, or otherwise nearby) a modification hint 331.

In one embodiment, the application analysis and modification functionality 120 may determine a matching one or more of the user feedback questions 195 for each of the modification hints (e.g., hints 311 and 331). For example, the end of a level of a game application may be matched to a question soliciting user feedback regarding a level of the game; the program code may be modified so that the question is presented to the user before a method returns to end the level. Accordingly, the modified application 126 may include additional instructions near the locations of the various hints. In one embodiment, additional instructions may also be inserted to represent triggering behaviors such as the elapsing of a particular duration of time during the execution of the application. The additional instructions may refer to the relevant user feedback questions to be presented to the user. As shown in the example of FIG. 3, an additional instruction 312 for user feedback acquisition may be inserted into the program code near the instruction 310 that is associated with the modification hint 311. Similarly, an additional new instruction 332 for user feedback acquisition may be inserted into the program code near the instruction 330 that is associated with the modification hint 331. Each of the additional instructions 312 and 322 may include multiple instructions, potentially including function calls and/or data values (e.g., a user feedback question or reference thereto). The additional instructions may comprise instructions in a higher-level programming language, in bytecode (or other programming language executable or interpretable on a virtual machine), or in machine language. An additional instruction may be inserted in any suitable location relative to the corresponding modification hint, such as after the hint (e.g., additional instruction 312) or before the hint (e.g., additional instruction 332).

In one embodiment, execution of the additional instruction 312 or 332 may cause the modified application 126 to fire an intent or otherwise ask another application to display a user interface element (e.g., a popup window) soliciting user feedback. Accordingly, the additional instructions may also be referred to herein as user interface instructions or instructions for user feedback acquisition. The question(s) displayed in the user interface element may be supplied by the modified application 126 based on the user feedback question(s) associated with the additional instruction 312 or 332. In one embodiment, the user may be required to enter one or more answers to one or more user feedback questions before the execution of the modified application 126 may proceed.

Figure 4:
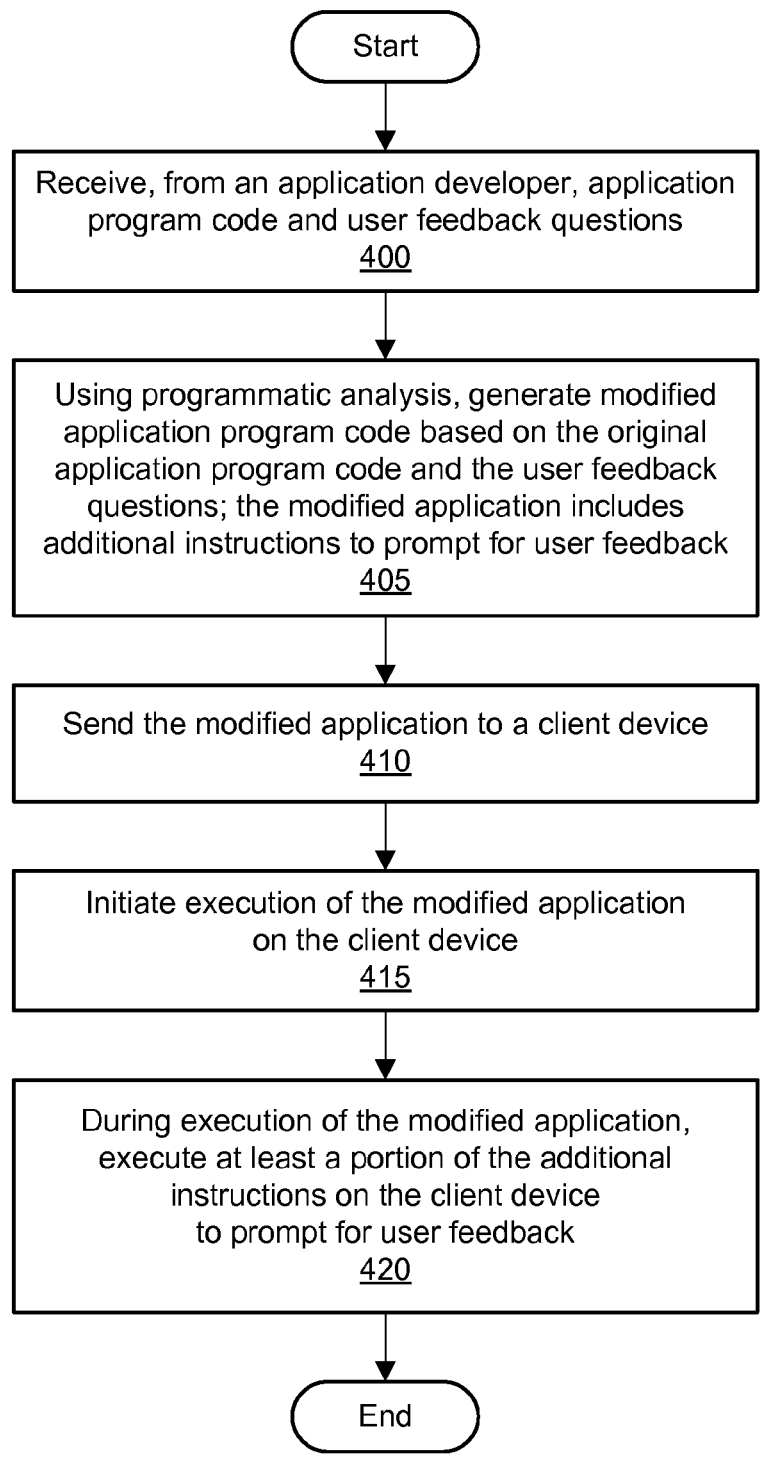
FIG. 4 is a flowchart illustrating a method for performing software testing with feedback acquisition, according to one embodiment.

FIG. 4 is a flowchart illustrating a method for performing software testing with feedback acquisition, according to one embodiment. As shown in 400, the program code for an application may be received from a developer of the application. A set of user feedback questions may also be received from the application developer. The application program code and the user feedback questions may be received by a suitable component of a software marketplace, such as the software testing server 110.

As shown in 405, modified program code may be generated. The modified program code may be generated based on the original application program code and the user feedback questions. The modified program code may be generated using programmatic analysis of the original program code, e.g., by executing a computer program to analyze the original program code without requiring additional user input during the analysis. The modified application may include additional instructions, based on the user feedback questions, to prompt for user feedback at various points. The programmatic analysis and modification of the application may match individual user feedback questions to particular locations in the program code, e.g., based on modification hints in the program code.

As shown in 410, the modified application may be sent to a client device. In one embodiment, the modified application may be selected for downloading and installation by a user of the client device, e.g., using a user interface element of a software marketplace application on the client device. The modified application may be received and stored by the client device.

As shown in 415, execution of the modified application may be initiated on the client device. In various embodiments, the execution may be initiated automatically (e.g., by the marketplace application) or based on user input. As shown in 420, at least a portion of the additional instructions may be executed on the client device during the execution of the modified application. Executing one of the additional instructions may cause the client device to prompt the user for user feedback regarding the modified application. The additional instructions may be executed at multiple points during the execution of the modified application. For example, if the modified application is a game with multiple levels, user feedback may be solicited at the end of at least some of the levels. The user feedback may be acquired based on user input to one or more user interface elements displayed on the client device, and the user feedback may then be sent to a feedback repository. The user feedback may represent the user's answers to the user feedback questions posed to the user.

Figure 5:
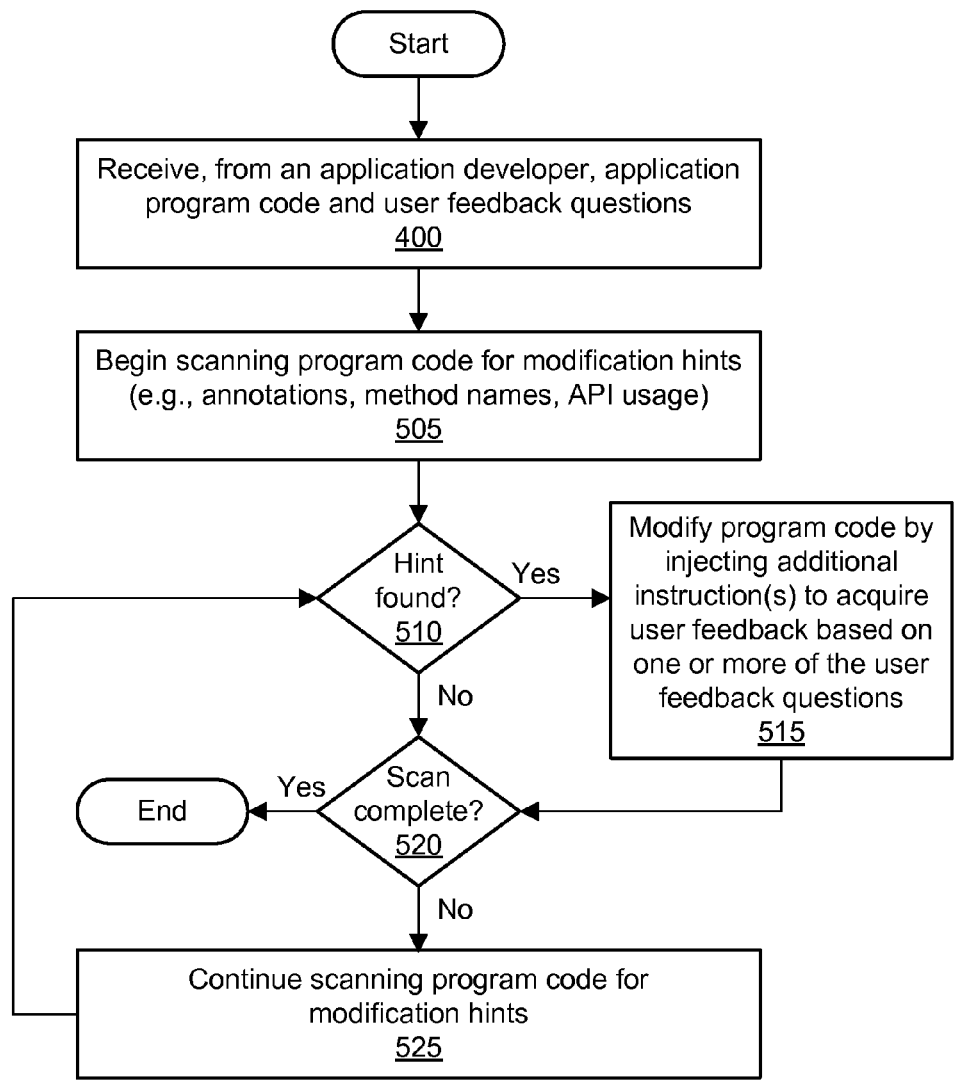
FIG. 5 is a flowchart illustrating a method for automatically modifying software for feedback acquisition, according to one embodiment.

FIG. 5 is a flowchart illustrating a method for automatically modifying software for feedback acquisition, according to one embodiment. As shown in 400, the program code for an application may be received from a developer of the application. A set of user feedback questions may also be received from the application developer. The application program code and the user feedback questions may be received by a suitable component of a software marketplace, such as the software testing server 110.

As shown in 505, the scanning of the program code for modification hints may begin. The program code may be scanned in any suitable order and using any suitable techniques. The modification hints may be executable or non-executable elements of the program code that tend to indicate locations in program execution where user feedback is desired. For example, the modification hints may include particular comments or annotations, particular variable declarations, particular method names, and/or the usage of particular APIs.

As shown in 510, it may be determined whether a hint is found in the current location of the scan. If so, then as shown in 515, the program code may be modified by injecting one or more additional instructions. The additional instruction(s) may be executable to acquire user feedback based on one or more of the user feedback questions. Individual user feedback questions may be matched to particular modification hints in the program code. For example, a "level complete" annotation may indicate a location in the program code where a level of a game has been completed, and one or more additional instructions may be inserted at a suitable location near the annotation to ask the user for answers to one or more user feedback questions defined in an "end of level" category.

If a hint was not found at the current point in the program code, or if the program code was modified to inject the additional instruction(s), then as shown in 520, it may be determined whether the scan of the program code is complete (e.g., whether the entire application has been scanned for modification hints). If so, then the programmatic analysis and modification of the application may end. If the scan is not complete, then as shown in 525, the scan of the program code for modification hints may continue with the next element(s) of the program code. In this manner, the program code for an application may be automatically and programmatically modified for acquisition of user feedback.

Figure 6:
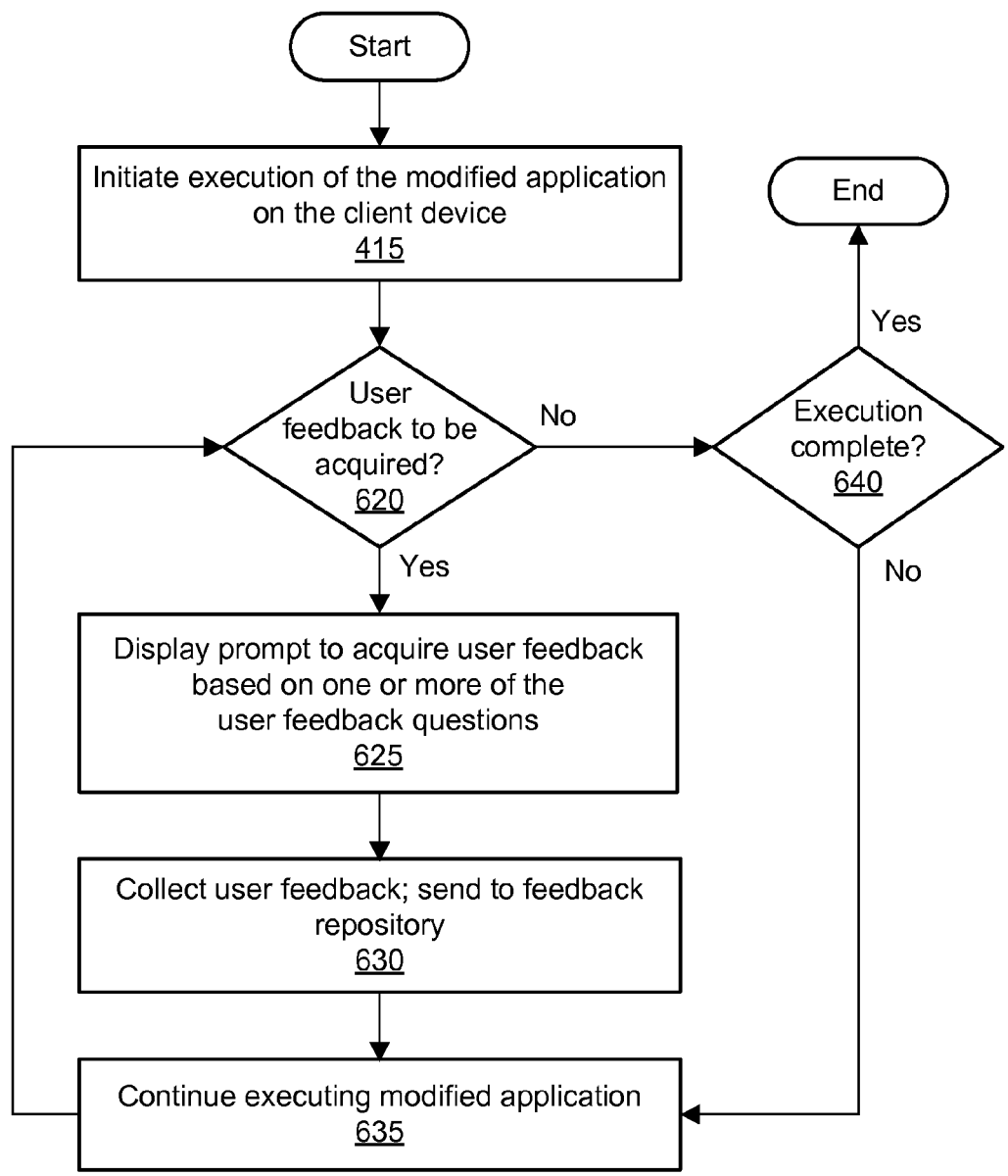
FIG. 6 is a flowchart illustrating a method for feedback acquisition using automatically modified software, according to one embodiment.

FIG. 6 is a flowchart illustrating a method for feedback acquisition using automatically modified software, according to one embodiment. As shown in 415, execution of the modified application may be initiated on the client device. As shown in 620, it may be determined whether user feedback is sought to be acquired at the current point in the execution of the application. User feedback may be sought when one of the additional instructions for user feedback acquisition is encountered (e.g., executed) in the modified application.

If so, then as shown in 625, a prompt may be displayed to acquire user feedback. The prompt may be based on one or more of the user feedback questions that are relevant to the current context of the application execution, e.g., as determined by the programmatic analysis discussed with respect to FIG. 5. The prompt may be implemented using any suitable interface element, such as a popup window. The prompt may represent a solicitation for one or more answers to one or more user feedback questions. In one embodiment, the prompt may be displayed on a display of the client device by a different application, e.g., a marketplace application also installed on the client device. As shown in 630, the user feedback may be collected in the user interface and sent to a feedback repository. The user feedback may include any suitable user input in response to the one or more questions. As shown in 635, the execution of the modified application may continue.

If user feedback is not sought at the current point in the execution of the application, then as shown in 640, it may be determined whether the execution of the application is complete. If so, then the feedback acquisition may end. If the execution is not complete, then the execution may continue as shown in 635.

Figure 7:
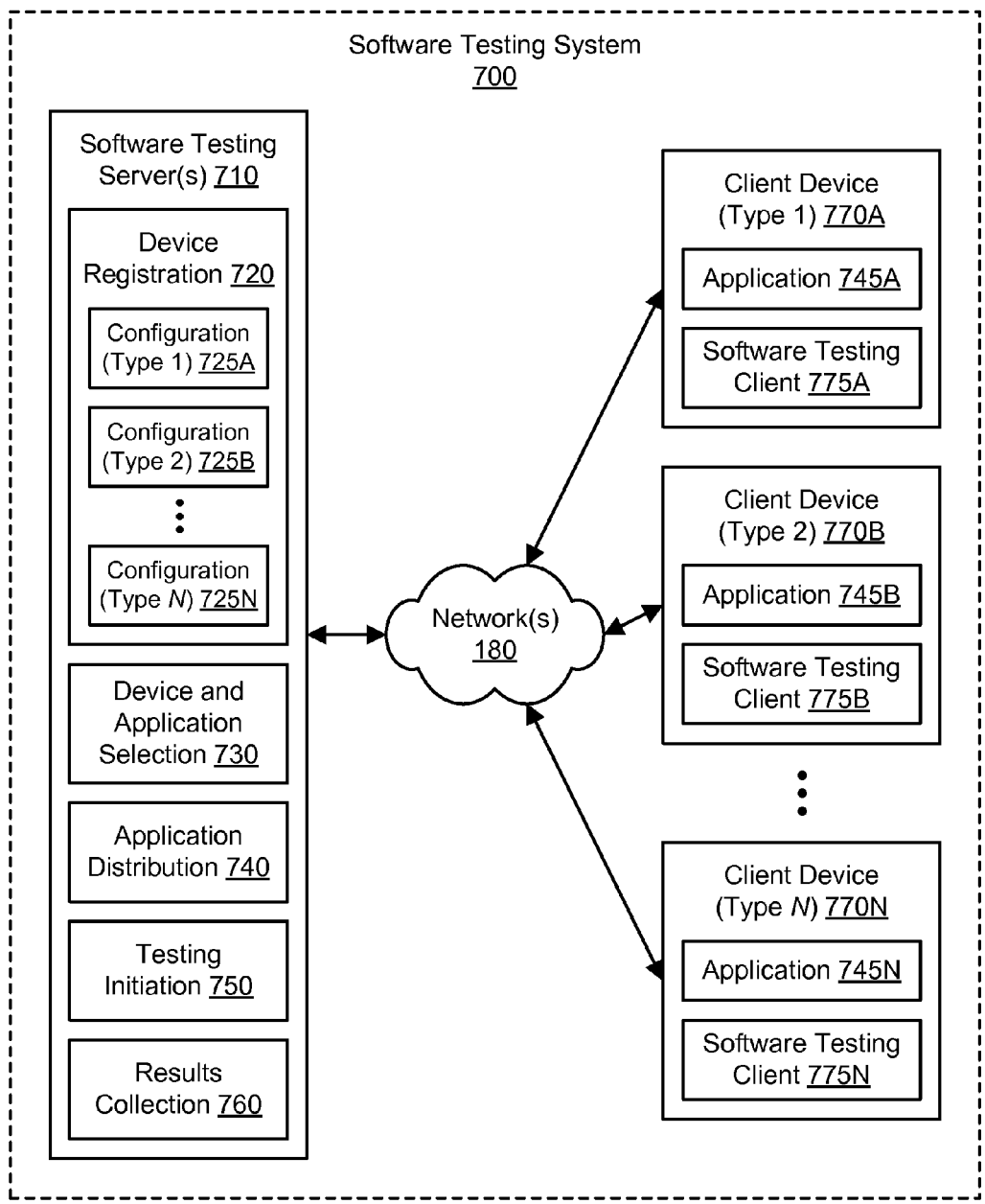
FIG. 7 illustrates an example system environment for a virtual device farm that implements software testing, according to one embodiment.

FIG. 7 illustrates an example system environment for a virtual device farm that implements software testing, according to one embodiment. The example system environment may implement a software testing system 700. The software testing system 700 may include at least one software testing server 710 and a plurality of client devices such as client devices 770A and 770B through 770N. Although one software testing server 710 and three client devices 770A, 770B, and 770N are illustrated for purposes of example, it is contemplated that any suitable number and configuration of software testing servers and client devices may be used with the software testing system 700. The software testing system 700 may use one or more networks 180 and interconnections to couple the various components. Elements of the software testing system 700 may be located in any suitable location relative to one another.

In various embodiments, the software testing server 710 may implement software testing using one or more registered devices of the client devices 770A-770N as a virtual device farm. The software testing server 710 may include a plurality of components that are configured to perform aspects of software testing, such as registering the client devices 770A-770N, selecting particular client devices to test particular applications, distributing the selected applications to the corresponding client devices, initiating the testing, and collecting results of the tests from the clients. For example, the software testing server 710 may include device registration functionality 720, device and application selection functionality 730, application distribution functionality 740, testing initiation functionality 750, and results collection functionality 760. The software testing server 710 may comprise one or more computing devices, any of which may be implemented by the example computing device 3000 illustrated in FIG. 11. In various embodiments, the functionality of the different services, components, and/or modules of the software testing server 710 (e.g., device registration functionality 720, device and application selection functionality 730, application distribution functionality 740, testing initiation functionality 750, and results collection functionality 760) may be provided by the same computing device or by different computing devices. If any of the various components are implemented using different computing devices, then the respective computing devices may be communicatively coupled, e.g., via a network. Each of the device registration functionality 720, device and application selection functionality 730, application distribution functionality 740, testing initiation functionality 750, and results collection functionality 760 may represent any combination of software and hardware usable to perform their respective functions, as discussed as follows.

In some embodiments, the software testing server 710 may be implemented using one or more virtual compute instances and/or one or more physical compute instances. The virtual compute instances and/or physical compute instances may be provisioned and maintained by a provider network that manages computational resources, memory resources, storage resources, and network resources. A virtual compute instance may comprise one or more servers with a specified computational capacity (which may be specified by indicating the type and number of CPUs, the main memory size, and so on) and a specified software stack (e.g., a particular version of an operating system, which may in turn run on top of a hypervisor). One or more virtual compute instances may be implemented by the example computing device 3000 illustrated in FIG. 11.

In one embodiment, the software testing server 710 may be associated with a software marketplace, also referred to as an application store. The software marketplace may offer different applications or other items of software to a variety of clients such as client devices 770A-770N. The software marketplace may offer an application selection interface to the client devices 770A-770N. In one embodiment, the application selection interface may be implemented using a marketplace application, an instance of which runs on each of the client devices 770A-770N. Using the application selection interface provided by the marketplace application, any of the client devices 770A-770N may select and download suitable applications from the software marketplace over the network(s) 180. The software marketplace may include any suitable authentication and/or payment functionalities to provide secure purchasing and downloading of selected applications.

Various applications may be provided to the software testing server 710 by the developer(s) of the applications using any suitable interface. As used herein, the term "application" generally includes any suitable item of software or software package. Each application may include a set of program code expressed using any suitable programming language(s), including higher-level programming languages, bytecode (or other machine language for a virtual machine), and/or machine language. In one embodiment, an application may represent a "beta" release. The entity maintaining the software testing server 710 (e.g., the entity maintaining the software marketplace) and/or the developer of the application may seek to have the beta release tested using a large and varied pool of client devices whose users have affirmatively opted into a software testing program. Using the systems and methods described herein, an application may be automatically provided to particular client devices in a virtual device farm and automatically tested using those client devices, and results of the testing may be collected from the client devices.

In one embodiment, users may choose to participate in a software testing program. As will be described in greater detail below, the software testing program may permit the software testing server 710 to use the client devices 770A-770N as a virtual device farm for automatic and programmatic testing of various applications. Before the client devices 770A-770N are used in the software testing program, the users of the client devices may affirmatively opt in to the software testing program. The users may opt in using any suitable method. For example, the users may opt in by checking an appropriately labeled checkbox when signing up for an account and/or connecting a new client device with an entity that maintains the software testing server 710 (e.g., the entity maintaining the software marketplace). In various embodiments, an opt-in processed by the software testing server 710 may relate to all client devices associated with a user account and/or to a particular client device operated by the user. In one embodiment, a user may opt out of the software testing program at any time.

In one embodiment, one or more components of the software testing server 710, such as the application distribution functionality 740, may implement aspects of the software marketplace. An application (e.g., applications 745A-745N) may be provided to suitable client devices using the appropriate components, such as the application distribution functionality 740. Each of the client devices 770A-770N may comprise one or more computing devices, any of which may be implemented by the example computing device 3000 illustrated in FIG. 11. In one embodiment, each of the client devices 770A-770N may connect to the software testing server 710 over the network(s) 180, e.g., using a local marketplace application executing on each of the client devices 770A-770N. Each of the client devices 770A-770N may download and store instances of one or more applications, such as application 745A on client device 770A, application 745B on client device 770B, and application 745N on client device 770N. The applications 745A-745N may represent different instances of the same application, instances of different versions of the same application, and/or instances of different applications.

Each of the client devices 770A-770N may also include a software testing client, such as software testing client 775A on client device 770A, software testing client 775B on client device 770B, and software testing client 775N on client device 770N. The software testing clients 775A-775N may perform various tasks associated with the programmatic software testing described herein. In various embodiments, one of the software testing clients 775A-775N may assist in the registration of the corresponding client device, collect and report information related to the configuration of the client device, assist in the installation of software to be tested, detect state changes in the client device, determine when to initiate a software test, initiate and/or control the execution of an application during the testing, and/or collect and report the results of the software testing. The software testing client may trigger events within tested applications, e.g., to perform testing of the applications under different scenarios. In one embodiment, the software testing client may be implemented as one or more components of a local marketplace application on each of the client devices 770A-770N, e.g., a client for the software marketplace associated with the software testing server 710. In one embodiment, the software testing client may be implemented as a standalone component on each of the client devices 770A-770N, and the standalone component may interact with a local marketplace client for the software marketplace. In one embodiment, the software testing client may be installed on the client device when the device is first connected to the software testing server 710 or associated software marketplace after the user of the device has opted into the software testing program. In one embodiment, the software testing client may be a component of a software marketplace client installed on the client device and may be activated on the client device after the user of the device has opted into the software testing program.

In one embodiment, the device registration functionality 720 may permit various client devices 770A-770N to be registered with the software testing server 710 for participation in the software testing program. In one embodiment, a client device may be registered when its user—who has opted in to the software testing program—first connects the client device to a server associated with the entity that maintains the software testing server 710. In one embodiment, a client device may be registered when the corresponding software testing client determines that the client device is ready to perform the software testing. In one embodiment, a client device may be registered at an initial stage (e.g., when the user first connects the device to the software marketplace), and the registration may be renewed at one or more later stages (e.g., when the client device is ready to perform the software testing).

In registering a client device, the device registration functionality 720 may store configuration information for each of the client devices 770A-770N that have been registered with the software testing server 710. As shown in the example of FIG. 7, the device registration functionality 720 may store a configuration 725A describing aspects of the configuration of client device 770A, a configuration 725B describing aspects of the configuration of client device 770B, and a configuration 725N describing aspects of the configuration of client device 770N. The stored configurations 725A-725N may include any suitable information, such as information usable to identify differences between hardware configurations, software configurations (e.g., different versions of an operating system), and/or device types. The configuration information may be provided by the software testing clients 775A-775N on the client devices 770A-770N. In one embodiment, each of the client devices 770A-770N may represent a different device type, such as a different hardware configuration or a different combination of manufacturer and model. For example, the client device 770A may be of a first type, the client device 770B may be of a second type, and the client device 770N may be of an Nth type. Accordingly, the stored configurations 725A-725N may reflect the differences in device types and/or identify the device types, such as the first type for configuration 725A, the second type for configuration 725B, and the Nth type for configuration 725N.

In one embodiment, the testing initiation functionality 750 may perform aspects of determining when to initiate software testing on a particular client device. In one embodiment, software testing may be initiated on a client device when the device is not in use and when the device has sufficient power. In one embodiment, the software testing client for the device may monitor the device for relevant state changes. For example, the software testing client may monitor any suitable elements of the device, such as processor usage, memory usage, and/or network usage, to determine when the device is relatively idle. To monitor the usage level of the device, the software testing client may interact with the operating system or any other suitable component on the device. As another example, the software testing client may monitor the power level and/or charging status of the device. Again, to monitor the power level and/or charging status of the device, the software testing client may interact with the operating system or any other suitable component on the device. In one embodiment, software testing may be initiated for a device when the usage level of the device is below a predetermined usage threshold and when the power level exceeds a predetermined power threshold. In one embodiment, software testing may be initiated only when the device is receiving power through an external power source (e.g., a charger). In one embodiment, the user of the device may specify a window of time in which the device may be used for testing, and software testing may be initiated during the user-specified window.

In one embodiment, the testing initiation functionality 750 may interact with the software testing client and/or software marketplace client on the corresponding client device. For example, the software testing client may detect one or more state changes in the client device, determine that the device is ready to perform software testing, and send this determination to the testing initiation functionality 750. In one embodiment, the testing initiation functionality 750 may then activate the device and application selection functionality 730 to select one or more applications for the device to test, activate the application distribution functionality to cause installation of the application(s) on the client device, and instruct the software testing client on the device to initiate the software testing.

In one embodiment, the device and application selection functionality 730 may select one or more applications to be tested for a particular device. In one embodiment, the device and application selection functionality 730 may select one or more client devices to use in testing a particular application. In either scenario, the device and application selection functionality 730 may match applications to client devices whose users have opted into the software testing program. In one embodiment, the software testing server 710 may attempt to test a particular application on many different types of devices or different configurations of the same device type. Accordingly, applications and client devices may be matched based on the configurations 725A-725N for the devices. In one embodiment, the device and application selection functionality 730 may cancel or postpone the software testing for a particular client device if no suitable application can be found at a particular time.

If the selected application is not currently installed on the corresponding client device, the application distribution functionality 740 may be used to send the application to the device. The application distribution functionality 740 may interact with the software testing client and/or software marketplace client on the corresponding client device to cause installation of the software to be tested. After the selected application has been installed, the software testing client on the device may initiate and/or control the testing of the application on the device. In one embodiment, the testing may include programmatic testing. As used herein, the term "programmatic testing" generally includes the execution of computer program instructions to test the program code of an application (e.g., applications 745A-745N). The testing of the application may include execution of the application on the client device according to one or more pre-defined scenarios. During the programmatic testing, the application may be run through various ones of the scenarios to test various aspects of the application, such as the usability, stability, performance, or any other desired characteristics of the application. In implementing a particular scenario, the software testing client may trigger various events within the tested application. Running the application through a pre-defined scenario may include simulating the interaction of the application with a user, such as by simulating the entry of user input. However, the programmatic testing may be performed in an automatic manner, e.g., without requiring actual user input during the testing. In one embodiment, the testing of an application may be canceled, suspended, or postponed if actual user input is received at the client device during the testing.

At various points during execution of the application on one of the client devices, the software testing client on the client device may assist in the collection of results of the software testing. For example, the testing results may relate to the usability, stability, performance, or any other desired characteristics of the application. The testing results may involve one or more logs (e.g., transaction logs, performance logs, etc.), alerts and/or exceptions (e.g., generated upon the application crashing or becoming unresponsive), performance metrics, etc. The software testing client may send the results of the testing to a suitable component of the software testing server 710, such as the results collection functionality 760.

In one embodiment, the results may be analyzed programmatically and/or by a user to determine whether an application has performed as designed on the various device types represented by the client devices 770A-770N. In one embodiment, the software marketplace may accept or reject the application for distribution based on the results of the testing. In one embodiment, the software marketplace may limit the distribution of the application to particular device types based on the results of the testing. In one embodiment, the software marketplace may warn potential users for particular device types based on the results of the testing. In one embodiment, the developer of the application may produce a new version of the tested application in response to the testing, and the new version may be re-tested in a similar manner using the software testing system 700.

Figure 8:
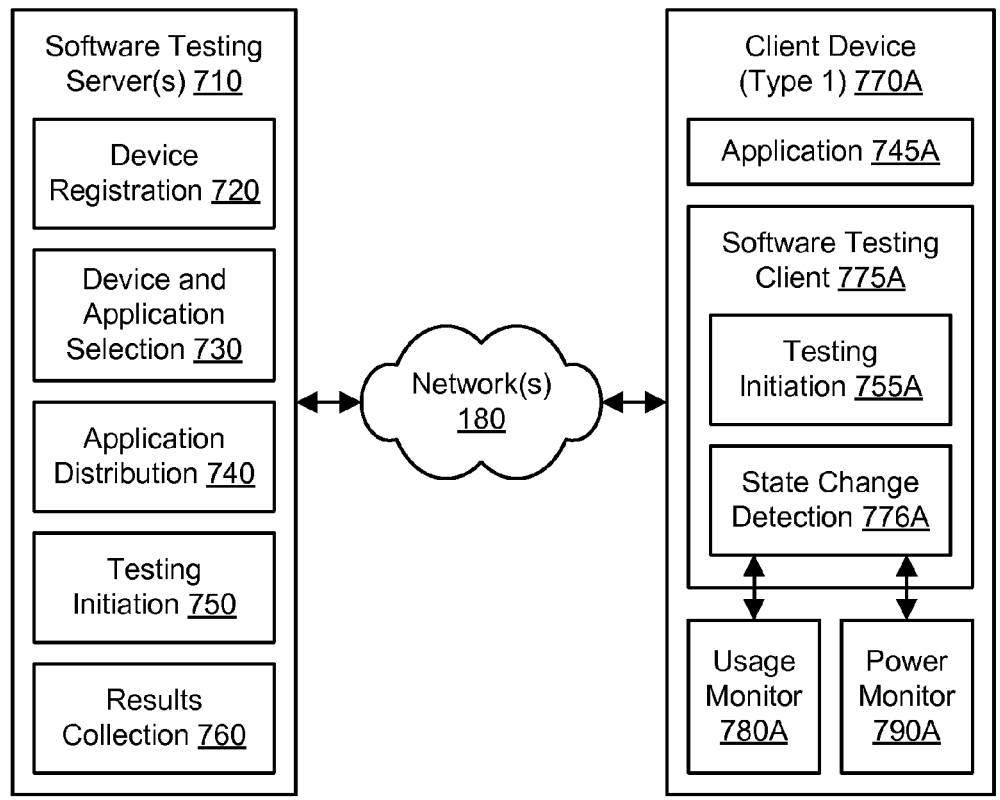
FIG. 8 illustrates an example of state change detection in a virtual device farm that implements software testing, according to one embodiment.

FIG. 8 illustrates an example of state change detection in a virtual device farm that implements software testing, according to one embodiment. As discussed above, in various embodiments, software testing may be initiated for a particular device under certain circumstances. For example, software testing may be initiated on a client device when the device is not in use and when the device has sufficient power. Accordingly, the software testing client for the device may monitor the device for relevant state changes. As shown in FIG. 8, the software testing client (e.g., software testing client 775A) for client device (e.g., client device 770A) may include a testing initiation functionality (e.g., testing initiation functionality 755A) and a state change detection functionality (e.g., state change detection functionality 776A).

The testing initiation functionality 755A may perform aspects of determining when to initiate testing on the client device 770A. In one embodiment, the testing initiation functionality 755A on the client device 770A may interact with the testing initiation functionality 750 on the software testing server 710. For example, the software testing client 775A, using the testing initiation functionality 755A, may detect one or more state changes in the client device 770A, determine that the device is ready to perform software testing, and send this determination to the testing initiation functionality 750. In one embodiment, the testing initiation functionality 750 may then activate the device and application selection functionality 730 to select one or more applications for the device to test, activate the application distribution functionality to cause installation of the application(s) on the client device, and instruct the software testing client 775A on the device to initiate the software testing.

The state change detection functionality 776A may interact with various components on the client device, such as a usage monitor 780A and/or a power monitor 790A, to detect any state changes that are relevant to the initiation of software testing. The usage monitor 780A may use any suitable technique to monitor the usage of the device. For example, the usage monitor 780A may monitor any suitable elements of the device, such as processor usage, memory usage, and/or network usage, to determine when the device is relatively idle. The power monitor 790A may use any suitable technique to monitor the power level and/or charging status of the device. In one embodiment, the usage monitor 780A and/or power monitor 790A may represent components of an operating system on the client device 770A.

Using the testing initiation functionality 755A, software testing may be initiated for the client device 770A based on suitable state changes detected by the state change detection functionality 776A. For example, software testing may be initiated for the client device 770A when the usage level of the device passes below a predetermined usage threshold and while the power level exceeds a predetermined power threshold. In one embodiment, software testing may be initiated only when the device is receiving power through an external power source (e.g., a charger). In one embodiment, the user of the device may specify a window of time in which the device may be used for testing, and software testing may be initiated when a change in state of a clock on the client device 770A indicates that the user-specified window has opened.

Figure 9A:
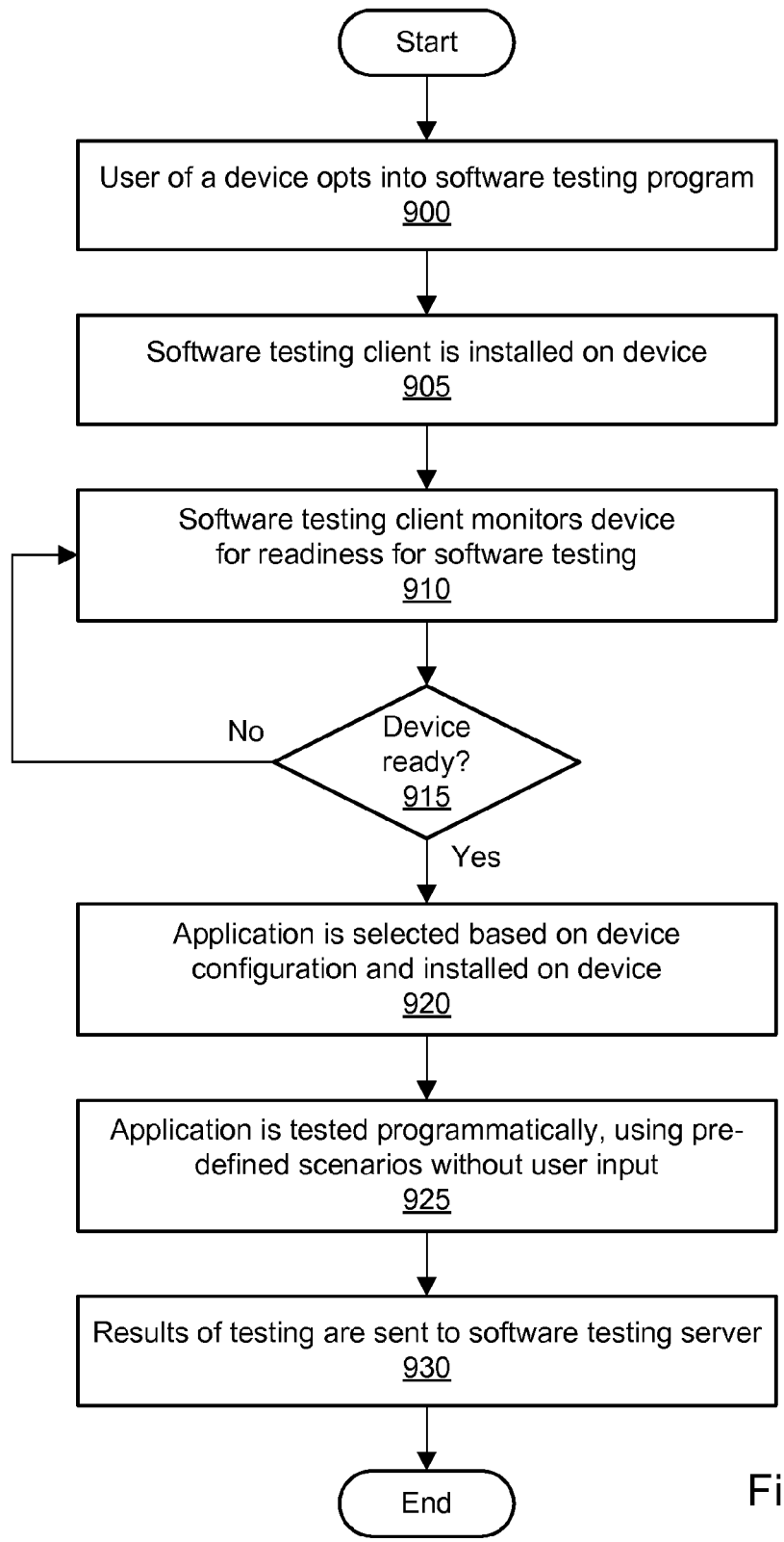
FIG. 9A is a flowchart illustrating a method for implementing a virtual device farm that implements software testing without user input, according to one embodiment.
Figure 9B:
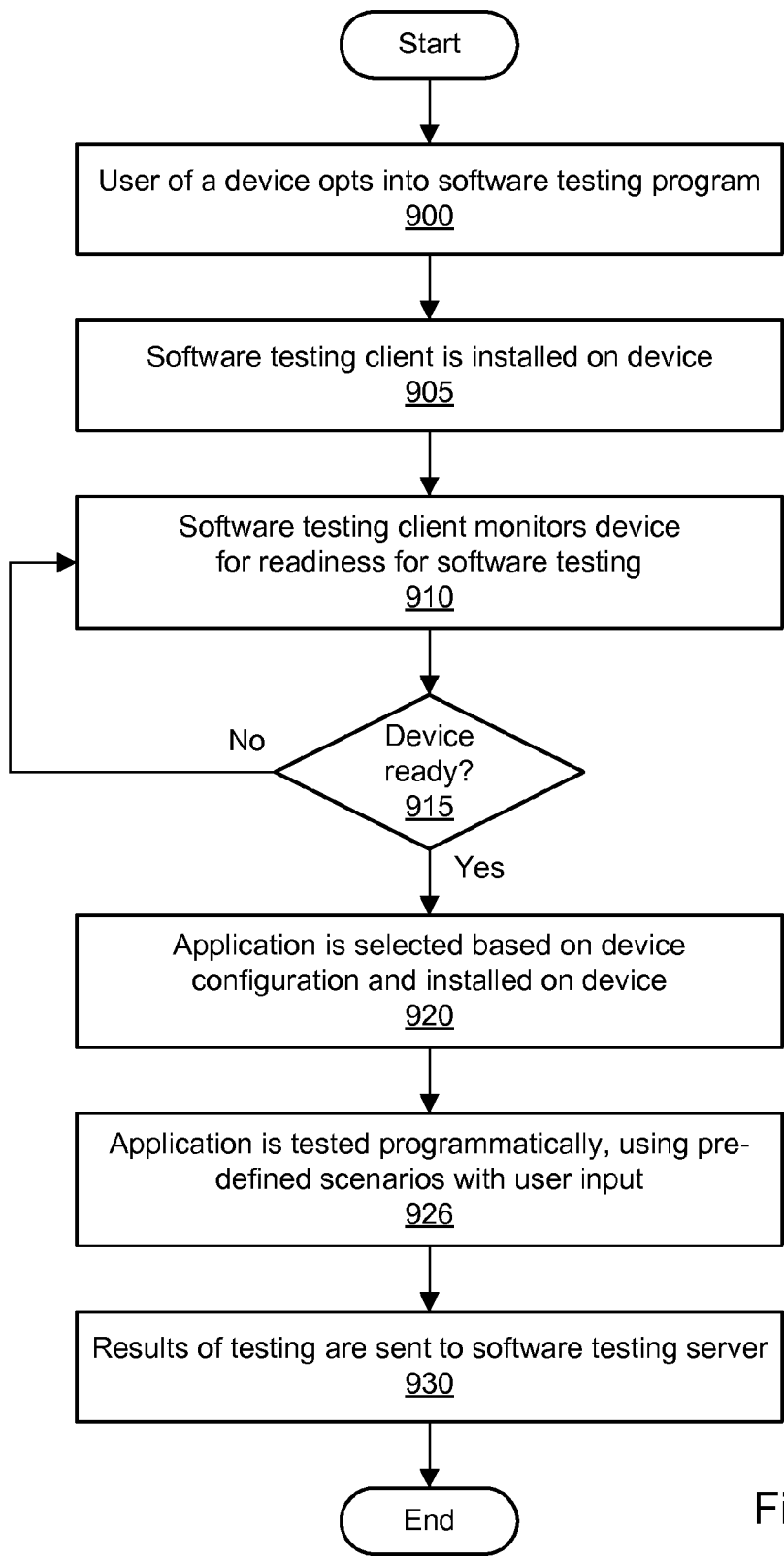
FIG. 9B is a flowchart illustrating a method for implementing a virtual device farm that implements software testing with user input, according to one embodiment.

FIG. 9A is a flowchart illustrating a method for implementing a virtual device farm that implements software testing without user input, according to one embodiment. As shown in 900, the user of a device may opt into a software testing program. As shown in 905, a software testing client may be installed on the device after the user has affirmatively opted in. As shown in 910, the software testing client may monitor the device for readiness for software testing. The software testing client may monitor the device for state changes that are relevant to the readiness or availability of the device. For example, the software testing client may monitor the usage level and power level (including the charging status) of the device.

As shown in 915, it may be determined if the device is ready to perform software testing. The readiness of the device may be determined based on the detection of relevant state changes or other monitoring of the usage level and/or power level of the device. For example, the device may be considered ready to perform software testing when the usage level drops below a particular usage threshold and while the device has sufficient power or is plugged into an external power source. If the device is not yet ready for testing, the monitoring continues, as shown in 905.

If the device is ready for testing, then as shown in 920, an application may be selected for testing using the device. The application may be selected based on the device configuration. The device configuration may indicate one or more hardware characteristics, one or more software characteristics (e.g., an operating system version), and/or a manufacturer and model of the device. As also shown in 920, the selected application may be installed on the device if the application is not already present on the device.

As shown in 925, the application may be tested programmatically on the device. Programmatic testing may include executing another program (such as the software testing client) to test the application. The application may be tested programmatically by running it through a set of pre-defined scenarios without necessarily needing to receive actual user input. Results of the testing, such as logs that capture performance metrics and alerts, may be gathered during and/or after the testing. As shown in 930, the results of the testing may be sent to a software testing server for analysis.

FIG. 9A is a flowchart illustrating a method for implementing a virtual device farm that implements software testing with user input, according to one embodiment. As shown in 900, the user of a device may opt into a software testing program. As shown in 905, a software testing client may be installed on the device after the user has affirmatively opted in. As shown in 910, the software testing client may monitor the device for readiness for software testing. The software testing client may monitor the device for state changes that are relevant to the readiness or availability of the device. For example, the software testing client may monitor the usage level and power level (including the charging status) of the device.

As shown in 915, it may be determined if the device is ready to perform software testing. The readiness of the device may be determined based on the detection of relevant state changes or other monitoring of the usage level and/or power level of the device. For example, the device may be considered ready to perform software testing when the usage level drops below a particular usage threshold and while the device has sufficient power or is plugged into an external power source. If the device is not yet ready for testing, the monitoring continues, as shown in 905.

If the device is ready for testing, then as shown in 920, an application may be selected for testing using the device. The application may be selected based on the device configuration. The device configuration may indicate one or more hardware characteristics, one or more software characteristics (e.g., an operating system version), and/or a manufacturer and model of the device. As also shown in 920, the selected application may be installed on the device if the application is not already present on the device.

As shown in 926, the application may be tested programmatically on the device. Programmatic testing may include executing another program (such as the software testing client) to test the application. The application may be tested programmatically by running it through a set of pre-defined scenarios. During the testing, a user of the client device may be prompted to enter user input at one or more stages. For example, the user may be prompted to take various manual steps to test various portions or aspects of the application. In one embodiment, user input may be required to initiate the testing, such that the testing may be initiated based on the user input. Results of the testing, such as logs that capture performance metrics and alerts, may be gathered during and/or after the testing. As shown in 930, the results of the testing may be sent to a software testing server for analysis.

Figure 10:
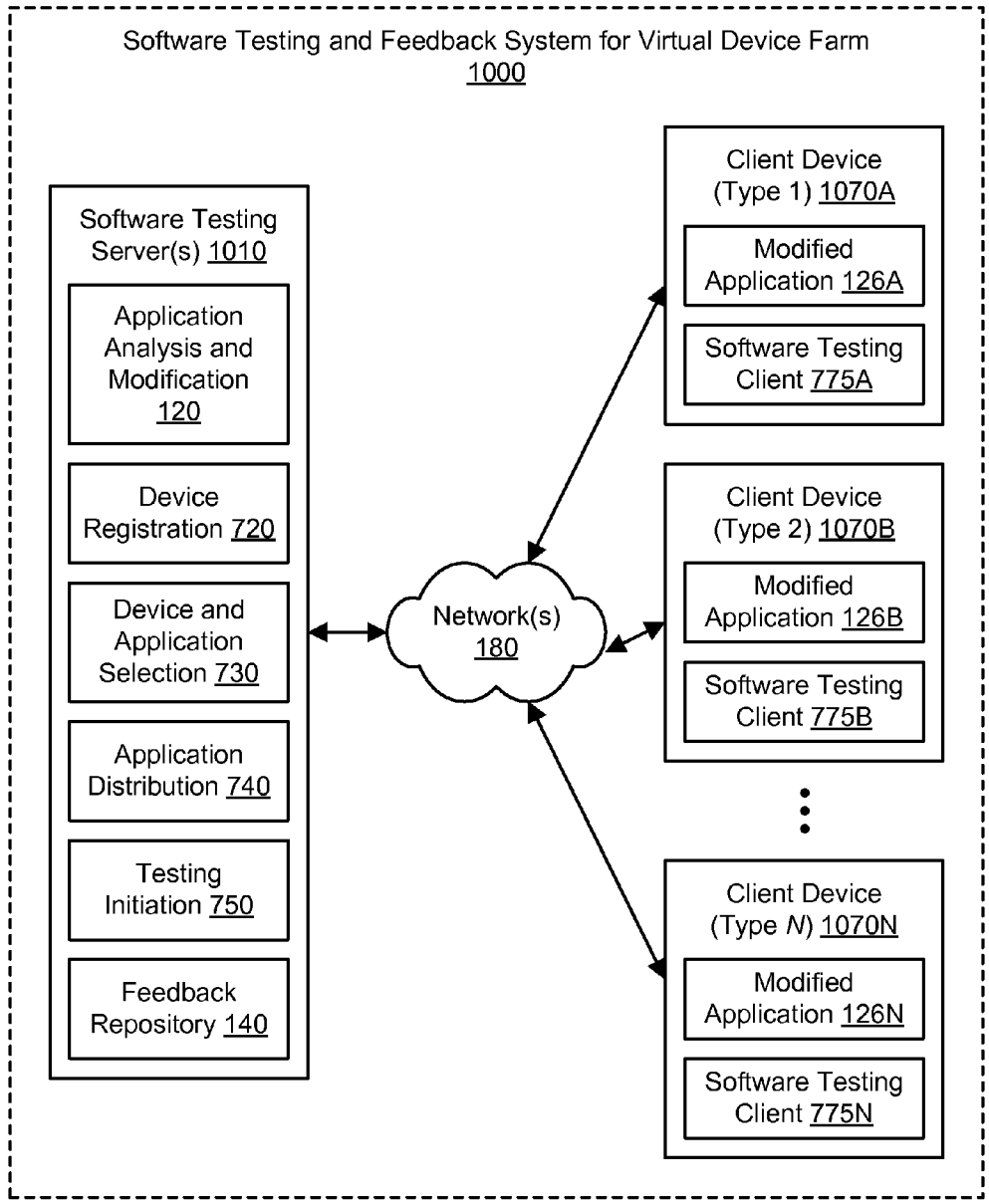
FIG. 10 illustrates an example system environment for software testing with feedback acquisition, using a virtual device farm, according to one embodiment.

In some embodiments, the techniques described herein for software testing with feedback acquisition may be combined with the techniques described herein for implementing a virtual device farm. FIG. 10 illustrates an example system environment for software testing with feedback acquisition using a virtual device farm, according to one embodiment. A software testing and feedback system 1000 for a virtual device farm may include one or more software testing servers 1010 and a plurality of client devices such as devices 1070A and 1070B through 1070N. Although one software testing server 1010 and three client devices 1070A, 1070B, and 1070N are illustrated for purposes of example, it is contemplated that any suitable number and configuration of software testing servers and client devices may be used with the software testing and feedback system 1000 for a virtual device farm. The software testing server 1010 may be implemented in a similar manner as the software testing servers 110 and 710, e.g., using one or more components similar to those of the software testing server 110 and/or one or more components similar to those of the software testing server 710. The devices 1070A-1070N may be implemented in a similar manner as the devices 160A-160N and 770A-770N, e.g., using one or more components similar to those of the devices 160A-160N and/or one or more components similar to those of the devices 770A-770N.

In one embodiment, users of the client devices 1070A-1070N may affirmatively opt into a software testing program, and, with user permission, the corresponding client devices may be used to perform beta testing of applications. The beta testing program may apply to one or more particular applications, to one or more particular categories of applications, or to substantially any applications. In one embodiment, a user who opts into the beta testing program may select the one or more particular applications, the one or more particular categories of applications, or the general class of applications to be tested using the corresponding client device.

As discussed above with respect to FIG. 1, the software testing server 1010 may provide software modified for feedback acquisition to one or more of the client devices 1070A-1070N over the network(s) 180. In one embodiment, the application analysis and modification functionality 120 may analyze an original application submitted by a developer and produce a modified application. The original application may include a set of program code expressed using any suitable programming language(s), including higher-level programming languages, bytecode (or other machine language for a virtual machine), and/or machine language. The application analysis and modification functionality 120 may analyze the original application using programmatic analysis to find locations where the program code should be modified for acquisition of user feedback.

Once the application analysis and modification functionality 120 has identified locations in the program code of the original application where the code should be modified, the application analysis and modification functionality 120 may generate a modified application. The modified application may be generated based on the original application using any suitable technique, including bytecode injection. In one embodiment, the modified application may include the program code of the original application plus one or more additional instructions. The additional instructions may be executable on a suitable platform (e.g., a suitable set of computing hardware running a suitable operating system or other executable environment), such as a platform implemented by one or more of the client devices 1070A-1070N, to prompt a user for user input at various points during execution of the modified application. The additional instructions may be based on user feedback questions also submitted by the developer. As will be described in greater detail below, the additional instructions may be executed to acquire user feedback related to the functioning of the modified application.

Before the client devices 1070A-1070N are used in the software testing and feedback system 1000 for a virtual device farm, the users of the client devices may affirmatively opt in to a software testing program. Each of the client devices 1070A-1070N may also include a software testing client, such as software testing client 775A on client device 1070A, software testing client 775B on client device 1070B, and software testing client 775N on client device 1070N. The software testing clients 775A-775N may perform various tasks associated with the software testing and feedback acquisition described herein. In one embodiment, the software testing client may be installed on the client device when the device is first connected to the software testing server 1010 or associated software marketplace after the user of the device has opted into the software testing program. In one embodiment, the software testing client may be a component of a software marketplace client installed on the client device and may be activated on the client device after the user of the device has opted into the software testing program.

In one embodiment, the device registration functionality 720 may permit various client devices 1070A-1070N to be registered with the software testing server 1010 for participation in the software testing program. In one embodiment, a client device may be registered when its user—who has opted in to the software testing program—first connects the client device to a server associated with the entity that maintains the software testing server 1010. In one embodiment, a client device may be registered when the corresponding software testing client determines that the client device is ready to perform the software testing. In one embodiment, a client device may be registered at an initial stage (e.g., when the user first connects the device to the software marketplace), and the registration may be renewed at one or more later stages (e.g., when the client device is ready to perform the software testing).

In registering a client device, the device registration functionality 720 may store configuration information for each of the client devices 1070A-1070N that have been registered with the software testing server 1010. The stored configurations may include any suitable information, such as information usable to identify differences between hardware configurations, software configurations (e.g., different versions of an operating system), and/or device types. The configuration information may be provided by the software testing clients 775A-775N on the client devices 1070A-1070N. In one embodiment, each of the client devices 1070A-1070N may represent a different device type, such as a different hardware configuration or a different combination of manufacturer and model. For example, the client device 1070A may be of a first type, the client device 1070B may be of a second type, and the client device 1070N may be of an Nth type.

In one embodiment, the device and application selection functionality 730 may select one or more applications, such as applications modified for acquisition of user feedback, to be tested for a particular device. In one embodiment, the device and application selection functionality 730 may select one or more client devices to use in testing a particular application. In either scenario, the device and application selection functionality 730 may match applications to client devices whose users have opted into the software testing program. In one embodiment, the software testing server 1010 may attempt to test a particular application on many different types of devices or different configurations of the same device type. Accordingly, applications and client devices may be matched based on the configurations for the devices.

If the selected application is not currently installed on the corresponding client device, the application distribution functionality 740 may be used to send the modified application to the device. The application distribution functionality 740 may interact with the software testing client and/or software marketplace client on the corresponding client device to cause installation of the software to be tested. After the selected application has been installed, the software testing client on the device may initiate and/or control the testing of the modified application on the device. The testing of the application may include execution of the modified application on the client device according to one or more pre-defined scenarios. During the testing, the application may be run through various ones of the scenarios to test various aspects of the application, such as the usability, stability, performance, or any other desired characteristics of the application. In implementing a particular scenario, the software testing client may trigger various events within the tested application. In one embodiment, the testing may be performed by executing at least some of the additional instructions to prompt for user feedback.

The user feedback may be collected via user interface prompts and sent to the software testing server(s) 710. As discussed above with respect to FIG. 1, the feedback repository 140 may store user feedback sent from the client devices 1070A-1070N to the software testing server 1010. In one embodiment, different versions of the modified application may be distributed to different ones of the client devices 1070A-1070N, and the respective results obtained by testing the different versions may be compared by the developer. In one embodiment, the same version of the modified application may be distributed to different ones of the client devices 1070A-1070N, and the respective results obtained by testing the same version on different device types or different configurations may be compared by the developer.

Illustrative Computer System

Figure 11:
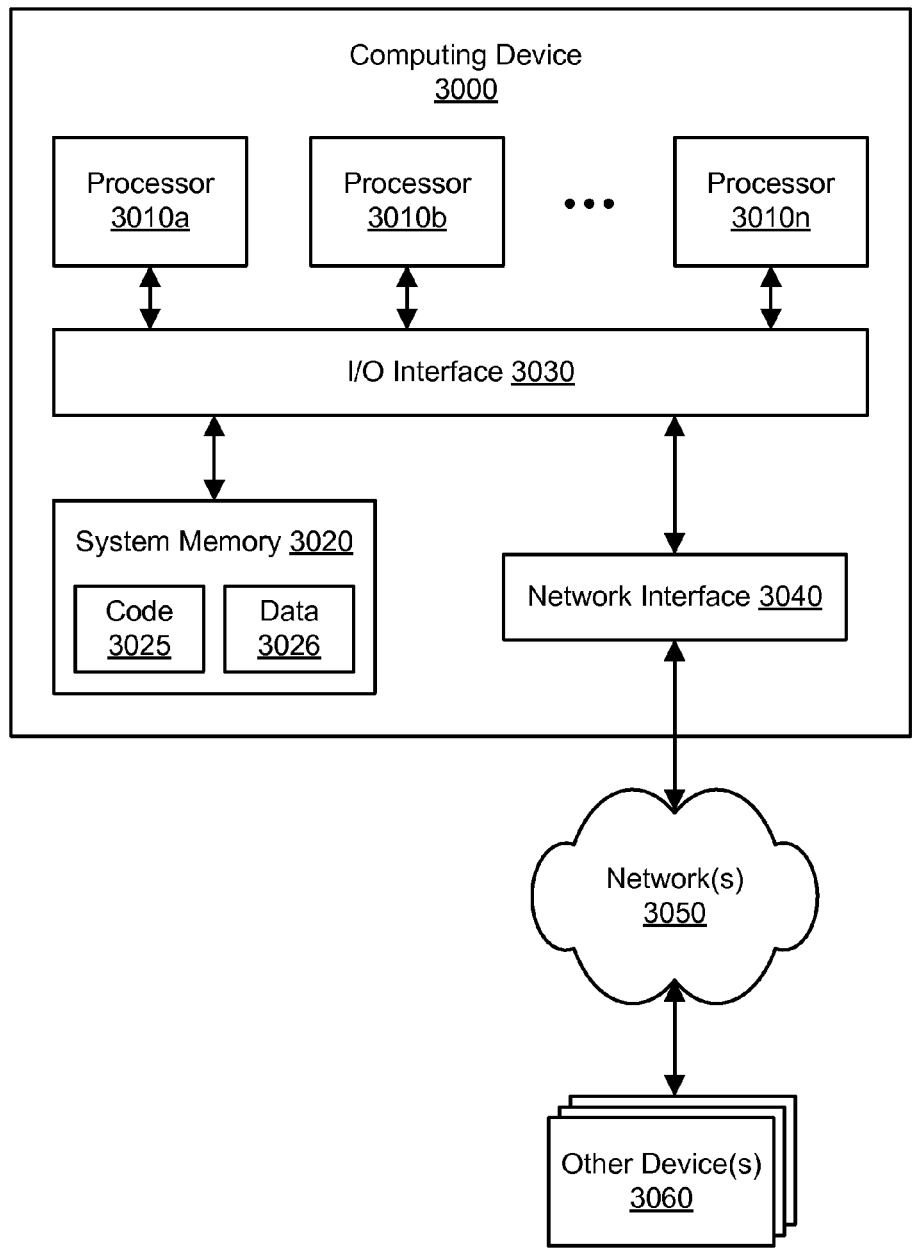
FIG. 11 illustrates an example of a computing device that may be used in some embodiments.

In at least some embodiments, a computer system that implements a portion or all of one or more of the technologies described herein may include a general-purpose computer system that includes or is configured to access one or more computer-readable media. FIG. 11 illustrates such a general-purpose computing device 3000. In the illustrated embodiment, computing device 3000 includes one or more processors 3010a-3010n coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010a and 3010b through 3010n (e.g., two, four, eight, or another suitable number), referred to collectively as processors 3010. Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   at least one processor;
   a memory coupled to the at least one processor, wherein the memory stores program instructions, wherein the program instructions are executable by the at least one processor to:
      receive, from a software developer, original application program code and a plurality of user feedback questions;
      generate modified application program code based on programmatic analysis of the original application program code, wherein the modified application program code comprises the original application program code and a plurality of additional user interface instructions, wherein the plurality of additional user interface instructions implement user interface prompts soliciting one or more answers to individual ones of the plurality of user feedback questions, and wherein, in generating the modified application program code based on the programmatic analysis of the original application program code, the program instructions are further executable by the at least one processor to:
         determine a plurality of modification hints in the original application program code;
         determine individual ones of the user feedback questions matching individual ones of the plurality of modification hints; and
         insert the plurality of additional user interface instructions based on locations of the plurality of modification hints;
      send the modified application program code to one or more client devices; and
      receive, from individual ones of the one or more client devices, user input responsive to individual ones of the user interface prompts.

2. The system as recited in claim 1, wherein the additional user interface instructions are executable to cause a marketplace application to display one or more user interface elements, wherein the user input is received using the marketplace application on the one or more client devices.

3. The system as recited in claim 1, wherein the program instructions are further executable by the at least one processor to:
   store the user input in a feedback repository, wherein the feedback repository is accessible to the software developer.

4. A computer-implemented method, comprising:
   receiving modified program code, wherein the modified program code is generated based on programmatic analysis of original program code, wherein the modified program code comprises a plurality of additional instructions based on a plurality of user feedback questions, and wherein, in the programmatic analysis of the original program code, the plurality of additional instructions are inserted based on locations of a plurality of modification hints in the original program code;
   initiating execution of the modified program code; and
   executing individual ones of the additional instructions during the execution of the modified program code, comprising soliciting user input from a user based on individual ones of the user feedback questions.

5. The method as recited in claim 4, wherein the plurality of modification hints comprise one or more annotations in the original program code.

6. The method as recited in claim 4, wherein the plurality of modification hints comprise one or more variable declarations in the original program code.

7. The method as recited in claim 4, wherein the plurality of modification hints comprise one or more instances of application programming interface (API) usage in the original program code.

8. The method as recited in claim 4, wherein soliciting the user input from the user based on the individual ones of the user feedback questions comprises:
   causing a marketplace application to display one or more user interface elements, wherein one or more answers to the individual ones of the user feedback questions are received from the user via the one or more user interface elements.

9. The method as recited in claim 4, further comprising:
   receiving, from the user, one or more answers to the individual ones of the user feedback questions; and sending the one or more answers to a feedback repository, wherein the feedback repository is accessible to a developer of the original program code.

10. The method as recited in claim 4, wherein the user input is solicited from the user at a plurality of points in time during the execution of the modified program code.

11. A computer-readable storage medium storing program instructions computer-executable to perform:
generating modified program code based on programmatic analysis of original application program code, wherein the modified application program code comprises a plurality of additional instructions, wherein the plurality of additional instructions implement user interface prompts for a plurality of user feedback questions at a plurality of locations in the modified application program code, and wherein, in generating the modified application program code based on the programmatic analysis of the original program code, the program instructions are computer-executable to perform:
determining a plurality of modification hints in the original application program code;
determining individual ones of the user feedback questions matching individual ones of the plurality of modification hints; and
inserting the plurality of additional instructions based on the plurality of modification hints;
sending the modified application program code to a client device, wherein individual ones of the additional instructions are executed on the client device, comprising causing a display of the user interface prompts for individual ones of the user feedback questions; and
receiving, from the client device, one or more answers to the individual ones of the user feedback questions.

12. The computer-readable storage medium as recited in claim 11, wherein the plurality of modification hints comprise one or more comments in the original application program code.

13. The computer-readable storage medium as recited in claim 11, wherein the plurality of modification hints comprise one or more method names in the original application program code.

14. The computer-readable storage medium as recited in claim 11, wherein the original application program code comprises bytecode, and wherein, in generating the modified application program code based on the programmatic analysis of the original program code, the program instructions are computer-executable to perform:
using bytecode injection to add the plurality of additional instructions to the modified application program code.

15. The computer-readable storage medium as recited in claim 11, wherein the user interface prompts are displayed on the client device by a marketplace application.

16. The computer-readable storage medium as recited in claim 11, wherein the program instructions are computer-executable to perform:
storing the one or more answers in a feedback repository, wherein the feedback repository is accessible to a developer of the original application program code.

17. The computer-readable storage medium as recited in claim 11, wherein the program instructions are computer-executable to perform:
selecting the client device from a plurality of client devices based on one or more hardware characteristics of the selected client device.

\* \* \* \* \*